May 13, 1924.

I. BENKÖ

DRAWING IMPLEMENT

Filed Jan. 11, 1921     3 Sheets-Sheet 1

1,494,055

Inventor.
Ivan Benkö
By Lawrence Langner
Attorney.

May 13, 1924.

I. BENKÖ

DRAWING IMPLEMENT

Filed Jan. 11, 1921      3 Sheets-Sheet 2

1,494,055

Inventor:
Ivan Benkö
By Lawrence Longuet
Attorney.

May 13, 1924.

I. BENKÖ

1,494,055

DRAWING IMPLEMENT

Filed Jan. 11, 1921.   3 Sheets-Sheet 3

Inventor.
Ivan Benkö
By Lawrence Langner
Attorney

Patented May 13, 1924.

1,494,055

UNITED STATES PATENT OFFICE.

IVAN BENKÖ, OF VIENNA, AUSTRIA.

DRAWING IMPLEMENT.

Application filed January 11, 1921. Serial No. 436,541.

*To all whom it may concern:*

Be it known that I, IVAN BENKÖ, a citizen of Hungary, residing at Vienna, Austria, have invented certain new and useful Improvements in Drawing Implements, of which the following is a specification.

In the drawing occupation the draughtsman works mostly with T-square and triangle and measures dimensions with a separate rule. The measuring operation is time-consuming because the draughtsman must handle alternately the triangle and the rule. The present invention has for its object to provide a time-saving drawing implement and, to that end, a graduated measuring wheel is combined with a drawing instrument, such as a T-square or triangle, and in shifting the instrument over the paper the wheel rolls in contact therewith and measures the distance passed over.

Several embodiments of the invention are illustrated in the accompanying drawings, in which:—

Figure 1:
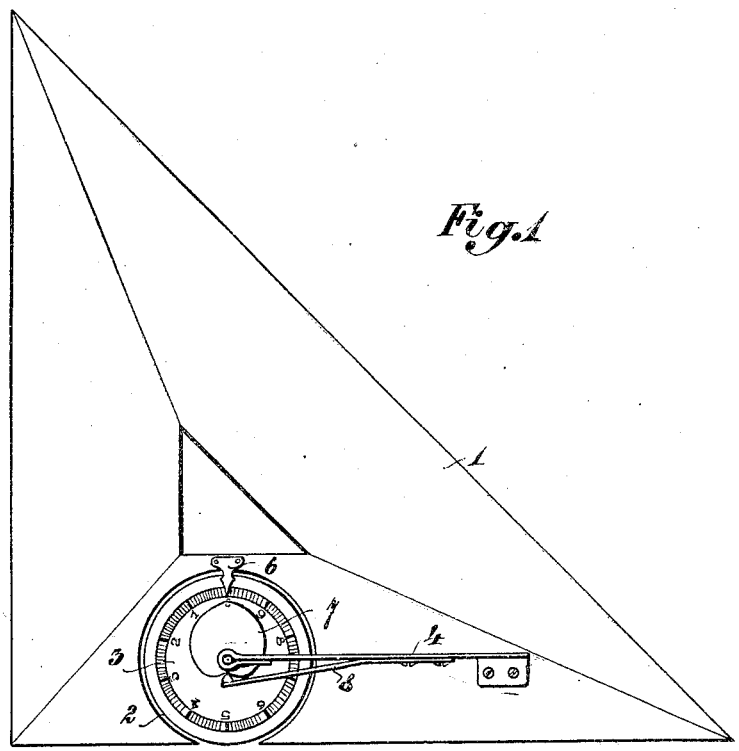
Fig. 1 is a front elevation of a triangle provided with a measuring wheel.
Figure 2:
Fig. 2 is an edge view of the construction shown in Fig. 1.
Figure 3:
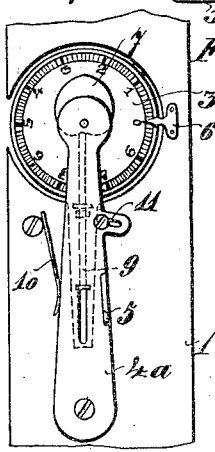
Figure 4:
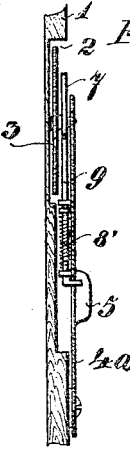
Figure 5:
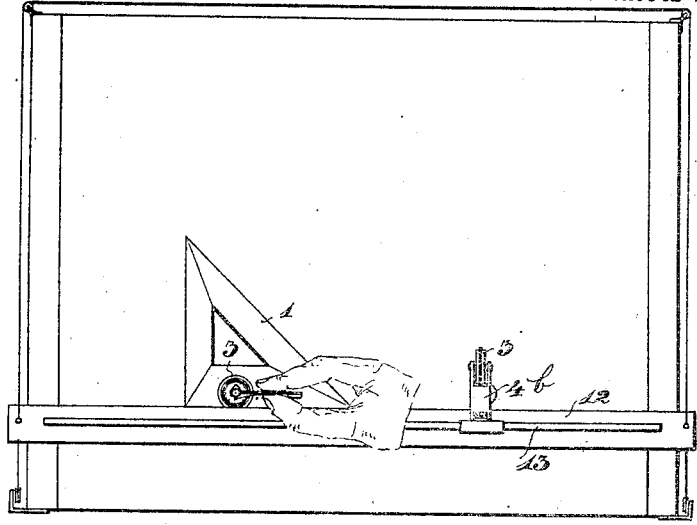
Figure 6:
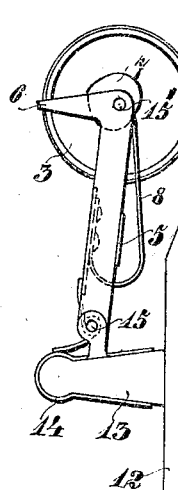
Figure 7:
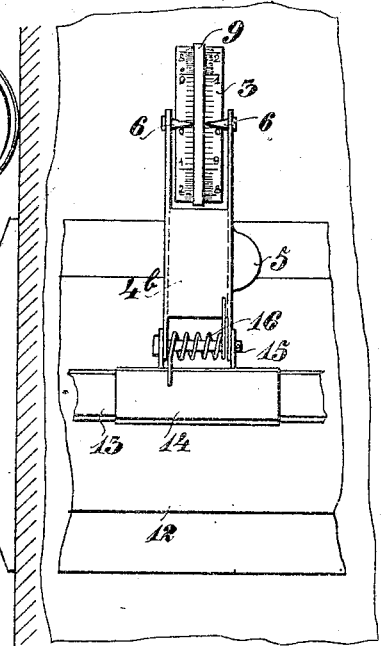
Figure 8:
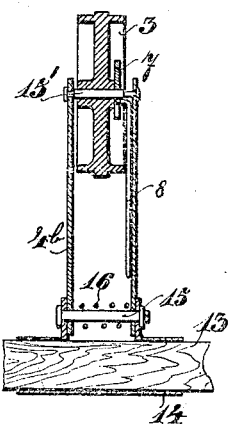
Figure 9:
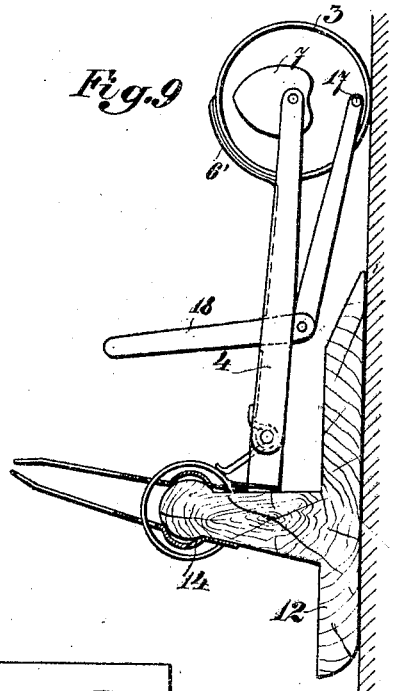
Figure 10:
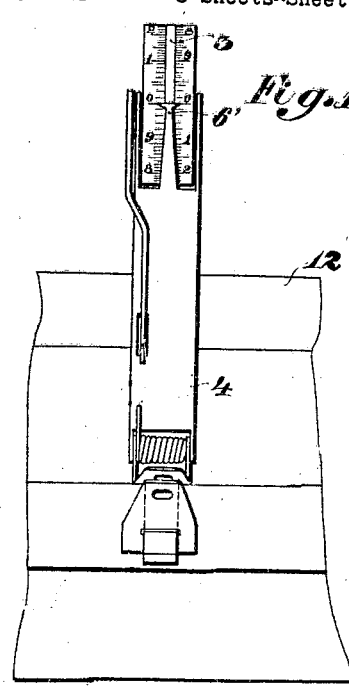
Figure 11:
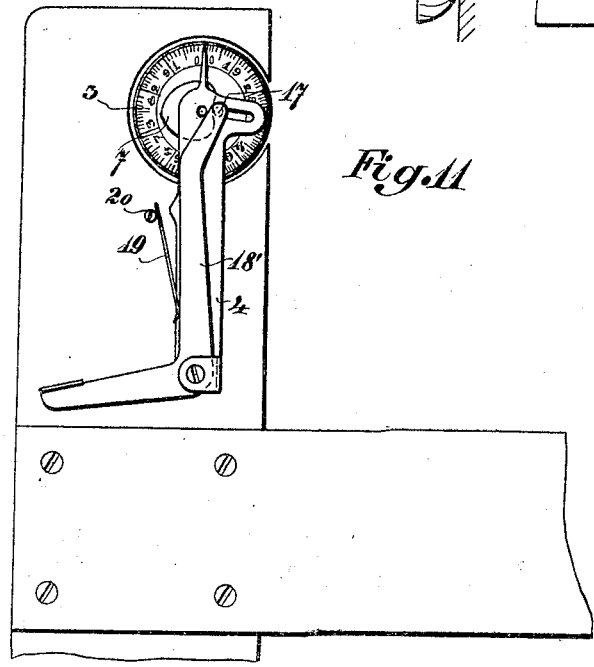

Figs. 3 and 4 are front and edge views, respectively, of a rule, broken away, provided with a measuring wheel having a modified supporting arrangement, Fig. 5 illustrates the manner of using the device shown in Fig. 1 in connection with a parallelly sliding rule, Fig. 6 is a side elevation and Fig. 7 a plan view of a sliding rule, as illustrated in Fig. 5, provided with a measuring roller, Fig. 8 is a horizontal section through the roller and its support, Fig. 9 is a cross-sectional view of a ruler provided with a modified form of measuring device and Fig. 10 is a corresponding plan view, and Fig. 11 shows a T-square having its crosshead provided with a measuring roller.

Stated briefly, my invention consists in the provision of a graduated roller in connection with a suitable ruler, the roller being arranged to roll in contact with the paper or another ruler as the ruler carrying the roller is slid along the paper.

As shown in Figs. 1, 2, 3, 4, 5 and 11, the measuring roller 3 may be arranged within a circular cut-out portion 2 of the measuring implement 1, whether this measuring implement be a triangle, T-square or straight ruler. This cut-out portion opens at an edge of the measuring implement and such edge is normally substantially tangent to the circumference of the roller.

The axle of the roller is journaled in the end of a spring arm 4 which is secured at its other end to the implement, as by screws. The roller may be caused to protrude slightly beyond the edge of the implement by pressing with a finger against the arm 4 or against a projection 5 thereon, whereby the roller may be caused to bear upon the edge of another ruler, as illustrated in Fig. 5 and, by shifting the implement carrying the roller, the latter will be caused to turn by friction and will show on its scale the distance that the implement has been displaced. In the construction shown in Fig. 11 a spring 19 secured to the arm 4 and acting against a stop 20 normally maintains the roller protruding from the cut-out 2, whereas in Fig. 1 the arm 4 is a spring arm and normally maintains the roller so that it does not protrude from the cut-out 2.

In the construction shown in Fig. 1 the roller 3 is automatically returned to its zero position, that is the position in which the zero on the scale is opposite a fixed index 6. The means for returning the roller to zero position comprises a heart-shaped disk 7 attached to the roller or to its axle and a spring 8 attached to the arm 4 and carrying at its free end a point which bears against the edge of the eccentrically mounted disk 7 and tends to turn the disk to such a position that the point occupies the notch in the edge of the disk. Instead of employing a spring 8, as in Fig. 1, a sliding rod 9 acted upon by a coil spring 8' may be employed, as illustrated in Figs. 3 and 4. In the latter figures, a spring 10 carried by arm 4ª and acting against a fixed stop on the ruler normally maintains the roller withdrawn within the cut-out 2. The arm 4ª may be provided with a slot through which a pin 11 extends for limiting the movement of the arm under the influence of the spring 10.

The roller 3 may carry a scale having graduations corresponding to any desired measuring system and it may be provided on its circumference with a rib to ensure a better frictional engagement of the roller with the contacting surface.

As shown in Figs. 5, 6, 7 and 8, a T-square or parallel ruler may be provided with a longitudinal rib 13 and a measuring roller detachably mounted thereon by means of a spring clamp 14 which permits shifting of the measuring device along the rib. The spring clamp 14 carries an axle 15 upon which is journaled at one end the arm $4^b$ which carries at its other end the axle 15' upon which is journaled the roller 3. A spring 16 surrounds the axle 15 and serves to press the roller against the drawing paper. If the draughtsman desires to lift the roller from the paper, he engages the projection 5 with his finger and lifts the arm $4^b$. As soon as the arm is lifted, the spring 8 and heart-shaped disk 7 automatically return the roller to zero position. The zero pointers 6 are here laterally arranged on the supporting arm $4^b$.

In the construction shown in Figs. 9 and 10, the roller is simultaneously lifted from the paper and returned to zero position by means of a lever 18 pivoted on the arm 4 and having a pin adapted to be brought into engagement with the heart-shaped disk 7. The pointer 6' is carried by a part projecting from the lever 4.

In the construction shown in Fig. 11, the roller is lifted by means of a lever 18' pivoted upon the arm 4 and carrying at its end a pin 17 which moves in a slot in the arm 4 and engages the disk 7 for returning the roller to zero position.

Having now described my invention in several of its possible embodiments, what I claim as new and desire to secure by Letters Patent, is:—

What I claim is:—

1. A drawing implement, comprising a ruler having a roller journaled thereon and adapted for rolling contact with a surface to be measured, said roller being provided with a measuring scale, means for indicating the zero position of said roller, and means for returning said roller to zero position at the end of the measuring operation.

2. A drawing implement, comprising a ruler, a carrier movably mounted upon said ruler, a roller journaled on said carrier and adapted for rolling contact with a surface to be measured, said roller being provided with a measuring scale, means for indicating the zero position of said roller, and means on said carrier for returning said roller to zero position at the end of the measuring operation.

3. A drawing implement, comprising a ruler provided with a cut-out portion opening at the edge of the ruler, a carrier movably mounted upon said ruler, a roller journaled upon said carrier and adapted for rolling contact with a surface to be measured, said roller being located in said cut-out portion and provided with a measuring scale, means acting upon said carrier for causing said roller to protrude slightly from the edge of said ruler, means for indicating the zero position of said roller, and means for returning said roller to zero position at the end of the measuring operation.

4. A drawing implement, comprising a ruler having a roller journaled thereon and adapted for rolling contact with a surface to be measured, said roller being provided with a measuring scale, means for indicating the zero position of said roller, and means for automatically returning said roller to zero position at the end of the measuring operation, said last means comprising a disk eccentrically mounted with respect to the axis of said roller, a member for frictional engagement with the edge of said disk and means for acting upon said member to bring it in contact with said disk.

5. A drawing implement, comprising a ruler, a carrier movably mounted on said ruler, a roller journaled on said carrier and adapted for rolling contact with a surface to be measured, said roller being provided with a measuring scale, means acting on said carrier for yieldingly maintaining said roller in an operative position, a cam mounted on said roller, and means for shifting the carrier to move said roller to inoperative position and for acting upon said cam to return said roller to zero position.

In testimony whereof I affix my signature in presence of two witnesses.

IVAN BENKÖ.

Witnesses:
RICHARD KOMINIK,
MIRRLA WINLEY.